United States Patent
Naota

(10) Patent No.: US 7,628,555 B2
(45) Date of Patent: Dec. 8, 2009

(54) METHOD OF IMAGE FORMING AND IMAGE FORMING APPARATUS

(75) Inventor: Tomonori Naota, Osaka (JP)

(73) Assignee: Kyocera Mita Corporation, Osaka (JP)

(*) Notice: Subject to any disclaimer, the term of this patent is extended or adjusted under 35 U.S.C. 154(b) by 639 days.

(21) Appl. No.: 11/276,829

(22) Filed: Mar. 15, 2006

(65) Prior Publication Data

US 2007/0217847 A1 Sep. 20, 2007

(51) Int. Cl.
*G06K 3/00* (2006.01)
(52) U.S. Cl. .......................................... 400/62; 400/67
(58) Field of Classification Search .................. 400/62, 400/67
See application file for complete search history.

(56) References Cited

U.S. PATENT DOCUMENTS

| | | | | |
|---|---|---|---|---|
| 5,644,408 A | * | 7/1997 | Li et al. | 358/468 |
| 6,827,279 B2 | | 12/2004 | Teraura | |
| 7,450,253 B2 | * | 11/2008 | Kiwada | 358/1.14 |
| 7,481,371 B2 | * | 1/2009 | Heidorn | 235/462.15 |
| 2004/0120522 A1 | | 6/2004 | Takeda et al. | |

FOREIGN PATENT DOCUMENTS

| | | |
|---|---|---|
| JP | 10-276335 A | 10/1998 |
| JP | 2002/175169 A | 6/2002 |
| JP | 2004/88586 A | 3/2004 |

* cited by examiner

*Primary Examiner*—Anthony H. Nguyen
(74) *Attorney, Agent, or Firm*—Global Ip Counselors, LLP

(57) ABSTRACT

A method of image forming comprises the steps of: converting image data into coded data with a code string using a coding key; forming a small pattern string on a sheet of printing paper by printing small patterns, each small pattern corresponding to a code constructing the coded data; recording a coding key or data corresponding to the coding key on a recording medium combined with the printing paper; advising a user to input a decoding key; reading out recorded data from the recording medium; determining whether the decoding key corresponds with the recorded data; scanning the small pattern string recorded on the printing paper when the decoding key corresponds with the recoded data; converting the small pattern string scanned from the printing paper into the code string; decoding the code string into the original image data using the decoding key; and printing an image on a sheet of printing paper based on the image data.

6 Claims, 11 Drawing Sheets

Fig. 10
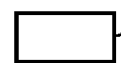

METHOD OF IMAGE FORMING AND IMAGE FORMING APPARATUS

BACKGROUND OF THE INVENTION

1. Field of the Invention

The present invention relates to an image forming method and an image forming apparatus which may be applied to/as a printer, a copier, a facsimile, an MFP (Multi-Function Peripheral) and so forth, and which in particular can form a code pattern on a manuscript and decode the code pattern.

2. Background Information

One conventional example in the related art is Japanese Laid-Open Patent Application No. 2002-175 (hereinafter to be referred to as Patent Reference 1). Patent Reference 1 introduces a method in which image data is converted into a code pattern before being printed out so that contents confidentiality may be protected even when the printing media is left behind.

In this case, however, if wrong decoding keys are inputted in decoding the coded data, illegible contents will be printed out, and this will be a waste of printing paper. Moreover, if a weak coding system is used, it may be possible that the decoding keys get figured out by relating the inputted keys to the outputted contents, and this may lead to a case of information leakage. In addition, even when correct decoding keys are inputted, if the coded data is put through an image forming apparatus which is inapplicable for decoding that code pattern, i.e. an image forming apparatus using different coding system etc., illegible contents will be printed out as in the case of inputting wrong decoding keys.

As for other conventional examples in the related art, there are Japanese Laid-Open Patent Application No. 2004-088586 (hereinafter to be referred to as Patent Reference 2) and Japanese Laid-Open Patent Application No. 2002-337426 (hereinafter to be referred to as Patent Reference 3).

Patent Reference 2 introduces a method of imposing copy restriction by attaching an IC chip storing data of a copy inhibit area to a manuscript. If copying of this manuscript with the IC chip is attempted, the inhibit area is changed into a blank part before printing.

In this case, however, since the contents printed on the manuscript are not coded, there is a possibility that information leakage occurs when the manuscript is left behind. In addition, if the IC chip is detached from the manuscript, there will be no copy restriction.

Patent Reference 3 introduces a method in which an RFID (Radio Frequency Identification) tag with software written on is attached to an edge of a sheet of printing paper on which a manual of the software is also printed. Therefore, Patent Reference 3 introduces a technology that enables the software and its manual to be put together, but it does not show any measure against leakage of confidential information.

In view of the above, it will be apparent to those skilled in the art from this disclosure that there exists a need for an improved image forming method and an improved image forming apparatus. This invention addresses this need in the art as well as other needs, which will become apparent to those skilled in the art from this disclosure.

SUMMARY OF THE INVENTION

It is therefore an object of the present invention to resolve the above-described problems and to provide an image forming method and an image forming device which can prevent leakage of confidential information written on a manuscript in case when the manuscript is left on a manuscript table of the image forming device or other place, and which can prevent unnecessary image forming on printing paper due to incorrect inputs of decoding keys.

It is also an object of the present invention to provide an image forming method and an image forming device which can prevent coded documents from being figured out in case when a manuscript is left on a manuscript table of the image forming device or other place.

It is another object of the present invention to provide an image forming method and an image forming device which can immediately determine whether coded data that a user is trying to decode is decodable with that image forming device, and thereby can save unnecessary efforts and time in acquiring legible document.

In accordance with a first aspect of the present invention, a method of image forming comprises the steps of: converting image data into coded data with a first code string using a coding key; forming a first small pattern string on a sheet of printing paper by printing first small patterns on the printing paper, each first small pattern corresponding to a code constructing the coded data; recording a coding key or data corresponding to the coding key on a first recording medium combined with the printing paper; advising a user to input a decoding key from an inputting means; reading out recorded data from the first recording medium; determining whether the decoding key inputted from the inputting means corresponds with the recorded data read out from the first recording medium; scanning the first small pattern string recorded on the printing paper when the decoding key inputted from an inputting means corresponds with the recoded data read out from the first recording medium; converting the first small pattern string scanned from the printing paper into the first code string; decoding the first code string into the original image data using the decoding key; and printing an image on a sheet of printing paper based on the image data.

In accordance with a second aspect of the present invention, a method of image forming comprises the steps of: converting image data into coded data with a first code string using a coding key; forming a first small pattern string on a sheet of printing paper by printing first small patterns on the printing paper, each first small pattern corresponding to a code constructing the coded data; converting each code included in a second code string of the coding key or data corresponding to the coding key into second small patterns; forming a second small pattern string by printing the second small patterns on a predetermined region of the printing paper; advising a user to input a decoding key from an inputting means; scanning the second small pattern string from the predetermined region of the printing paper; obtaining the coding key or the data corresponding to the coding key by converting the second small pattern string scanned from the predetermined region into a code string; determining whether the decoding key inputted from the inputting means corresponds with the coding key or the data corresponding to the coding key obtained by converting the second small pattern string scanned from the predetermined region into the code string; scanning the first small pattern string printed on the printing paper when the decoding key inputted from the inputting means corresponds with the coding key or the data corresponding to the coding key obtained by converting the second small pattern string scanned from the predetermined region into the code string; converting the first small pattern string scanned from the printing paper into the first code string; decoding the first code string into the original image data using the decoding key; and printing an image on a sheet of printing paper based on the image data.

In accordance with a third aspect of the present invention, an image forming apparatus comprises a manuscript table, a scanner, an electric tag reader, a paper feeding tray, a printing unit, a paper feeder, an electric tag writer, an inputting unit, and a controller. The scanner scans image on a sheet of printing paper placed on the manuscript table. The electric tag reader is arranged on the manuscript table. The paper feeding tray stocks one or more sheet of printing paper. The printing unit prints an image on a sheet of printing paper. The paper feeder feeds the printing paper to the printing unit and discharging the printing paper with the printed image to a discharge tray. The electric tag writer is arranged on a paper carrier path. The inputting unit is a structure for a user to input a decoding key. The controller switches between a coding mode and a decoding mode. In the coding mode, the controller converts image data into coded data with a first code string using a coding key, makes the printing unit form a first small pattern string on a sheet of printing paper by printing first small patterns on the printing paper, and makes the electric tag writer record the coding key or data corresponding to the coding key in a first recording medium combined with the printing paper. Each first small pattern corresponds to a code constructing the coded data. In the decoding mode, the controller makes the electric tag reader read out recorded data from the first recording medium, determines whether the decoding key inputted from the inputting unit corresponds with the recorded data read out from the first recording medium, makes the scanner scan the first small pattern string recorded on the printing paper when the decoding key inputted from the inputting unit corresponds with the recoded data read out from the first recording medium, converts the first small pattern string scanned from the printing paper into the first code string, decodes the first code string into the original image data using the decoding key, and makes the printing unit print an image on a sheet of printing paper based on the image data.

In accordance with a fourth aspect of the present invention, an image forming apparatus comprises a manuscript table, a scanner, a paper feeding tray, a printing unit, a paper feeder, an inputting unit, and a controller. The scanner for scans image on a sheet of printing paper placed on the manuscript table. The paper feeding tray stocks one or more sheet of printing paper. The printing unit prints an image on a sheet of printing paper. The paper feeder feeds the printing paper to the printing unit and discharging the printing paper printed with the printed image to a discharge tray. The inputting unit is a structure for a user to input a decoding key. The controller switches between a coding mode and a decoding mode. In the coding mode, the controller converts image data into coded data with a first code string using a coding key, makes the printing unit form a first small pattern string on a sheet of printing paper by printing first small patterns on the printing paper, converts each code included in a second code string of the coding key or data corresponding to the coding key into second small patterns, and makes the printing unit form a second small pattern string by printing the second small patterns on a predetermined region of the printing paper. Each first small pattern corresponding to a code constructing the coded data. In the decoding mode, the controller makes the scanner scan the second small pattern string from the predetermined region of the printing paper, obtains the coding key or the data corresponding to the coding key by converting the second small pattern string scanned from the predetermined region into a code string, determines whether the decoding key inputted from the inputting means corresponds with the coding key or the data corresponding to the coding key obtained by converting the second small pattern string scanned from the predetermined region into the code string, makes the scanner scan the first small pattern string printed on the printing paper when the decoding key inputted from the inputting means corresponds with the coding key or the data corresponding to the coding key obtained by converting the second small pattern string scanned from the predetermined region into the code string, converts the first small pattern string scanned from the printing paper into the first code string, decodes the first code string into the original image data using the decoding key, and makes the printing unit print an image on a sheet of printing paper based on the image data.

These and other objects, features, aspects, and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 10 is a pattern diagram representing an image of a manuscript which has been printed out in a coding mode according to a modified embodiment of the present invention.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

In this embodiment, an image forming apparatus with a structure which enables images to be inputted from outside a housing or from a position as close as possible to a side edge part of the housing is realized with a minimum number of component portions and without losing the thickness of optical component portions.

Figure 1:
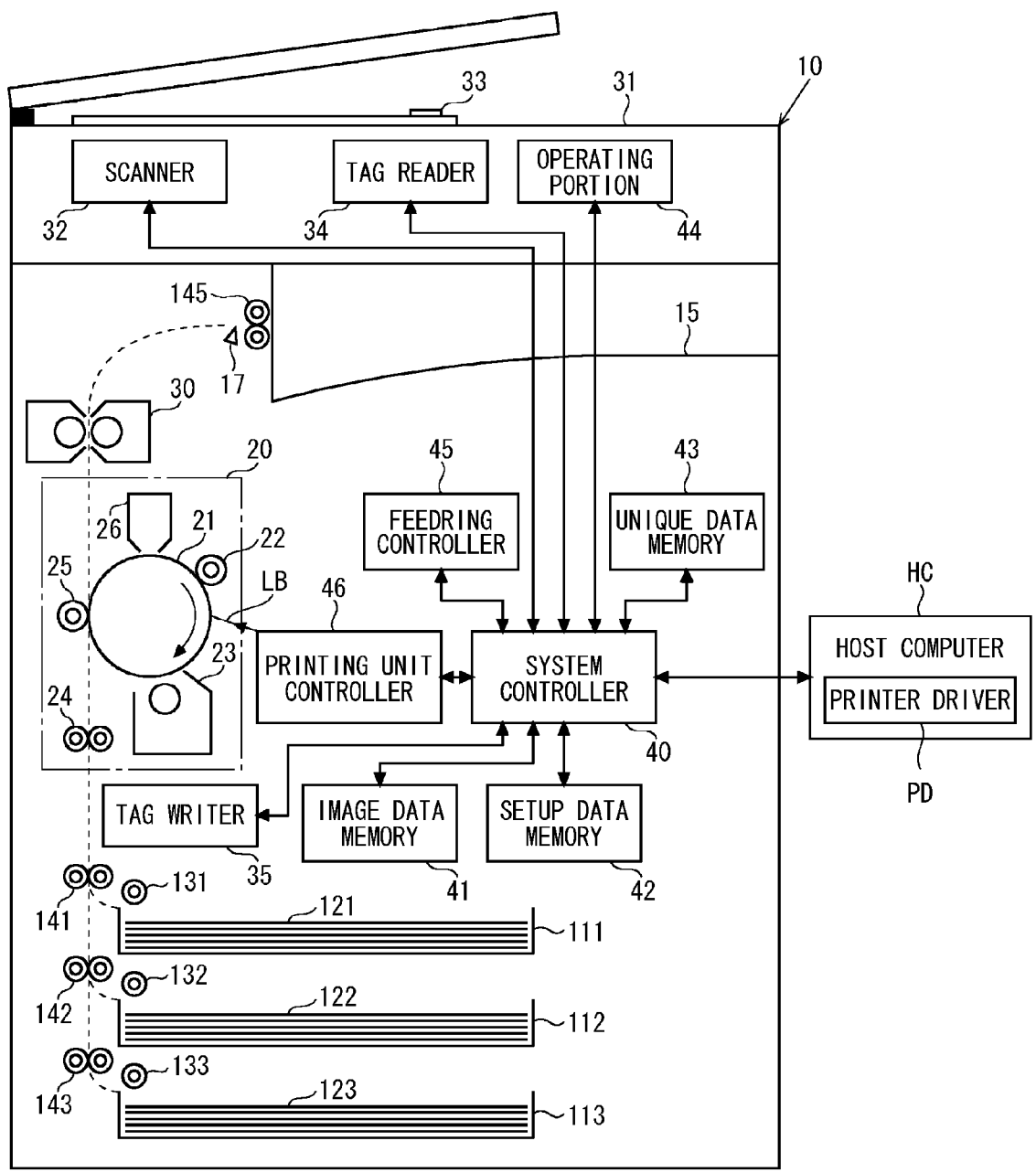
FIG. 1 is a diagram showing a schematic structure of an image forming system according to an embodiment of the present invention.

FIG. 1 is a diagram showing a schematic structure of an image forming system applying the present invention.

This system has a structure in which an image forming apparatus 10 (e.g. an MFP) is connected with a host computer HC, and possesses a document protection function applying image coding and decoding. The following description will refer to a case in which the image forming apparatus 10 is used as a printer under a coding mode for producing a coded document, and as a copier under a decoding mode for decoding the coded document into a non-coded document.

When the image forming apparatus 10 is used as a printer, the image forming apparatus 10 forms images on the printing paper based on image data provided by the host computer HC and data set up in the image forming apparatus 10.

As shown in FIG. 1, the image forming apparatus 10 has paper feeding trays 111, 112 and 113 in three stages where sheets of printing papers 121, 122 and 123 are set, respectively. For instance, the printing papers 121 and 122 may be sheets of plain paper, and the printing paper 123 may be sheets of printing paper with electronic tags 33 attached thereto. Corresponding to those paper feeding trays 111, 112 and 113, paper feeding rollers 131, 132 and 133 are arranged, respectively, and corresponding to the paper feeding rollers 131, 132 and 133, conveyance rollers 141, 142 and 143 are arranged, respectively. By this structure, the printing papers 121, 122 and 123 can be fed to an printing unit 20 via the paper feeding rollers 131, 132 and 133, and then via the conveyance rollers 141, 142 and 143, respectively.

In the printing unit 20 (i.e. a print engine in this embodiment), a surface of a photoconductive drum 21 is to be charged evenly by a charging roller 22. The charges on the photoconductive drum 21 will be eliminated selectively by a laser beam LB to form an electrostatic latent image, after which toner will be transferred to the charged part of the photoconductive drum 21 by a developer 23 to develop the electrostatic latent image.

A registration roller 24 functions to once stop the paper feeding of the printing paper being fed from the conveyance roller 143, and resume the paper feeding at predetermined timing to feed the printing paper between an electrostatic transferring roller 25 and the photoconductive drum 21. The electrostatic transferring roller 25 functions to make the toner image on the photoconductive drum 21 be transferred on the printing paper being fed through electrostatic image transferring. The printing paper having the toner image transferred thereto will path through a fixing unit 30 to be heated and pressured, and thereby it will have the toner image fixed thereto. Residual toner on the photoconductive drum 21 after the transferring will be removed by a cleaner 26.

After the fixing process, the printing paper will path through a paper exit roller 145 and a post-processing device 16 to be discharged on an exit tray 15. In the vicinity of the paper exit roller 145, a paper exit sensor 17 for detecting discharging printing paper is arranged.

A scanner 32 arranged under a manuscript table 31 functions to scan images on a manuscript placed on the manuscript table 31

Figure 2:
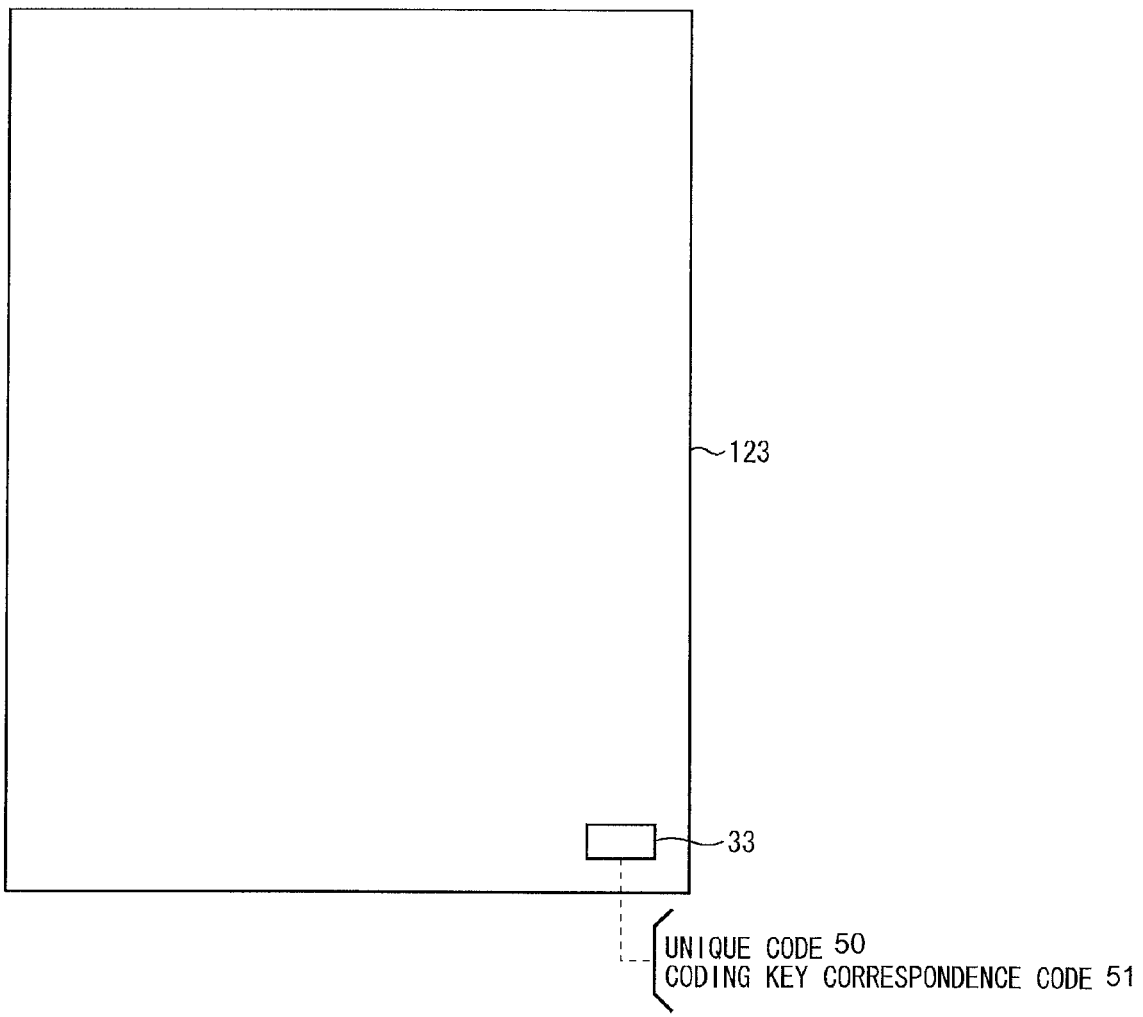
FIG. 2 is an overhead view of a sheet of printing paper having an electronic tag attached to an edge of it according to the embodiment of the present invention.

Now, as shown in FIG. 2, a sheet of printing paper 123 has an electronic tag 33 attached to an edge of it.

Furthermore, as shown in FIG. 1, a tag reader 34 is arranged near the manuscript table 31, and it is capable of reading the contents stored in the electronic tug 33 of the printing paper 123 without contacting it. A tag writer 35 is arranged on a paper path in the front of the printing unit 20, and it is capable of writing a unique code 50 and a coding key correspondence code 51 (q.v. FIG. 2) to the electronic tag 33 when forming a coded image on the printing paper 123. Here, depending on a size of the image forming apparatus 10 and a effective area of radio wave for reading from or writing into the electronic tag 33, it is also possible to arrange a tag reader/writer at one place instead of having the tag reader 34 and the tag writer 35 arranged separately at different places.

The unique code 50 and the coding key correspondence code 51 are used in the decoding mode. The unique code 50 is used in determining whether the image forming apparatus 10 is applicable for decoding a coded pattern formed on a manuscript 12 placed on the manuscript table 31. The coding key correspondence code 51 is used in determining whether decoding keys inputted from an operation inputting unit 44 are appropriate or not. The coding key correspondence code 51 corresponds with the coding keys and it includes a coded data generated by coding the coding key.

For the purpose of controlling the internal units of the image forming apparatus 10, the image forming apparatus 10 has a system controller 40. The system controller 40 is connected to the scanner 32, the tag reader 34, the tag writer 35, an image data memory 41 (which includes a work area), a setup data memory 42, a unique data memory 43, the operation inputting unit 44, a conveyance roller controller 45 and a printing unit controller 46.

In case of using the image forming apparatus 10 as a printer, the system controller 40 will arrange such that the image data provided by the host computer HC will be once stored in the image data memory 41. This image data is originally provided by a printer driver PD during a printing routine of an application program from, and it is written in a PDL (page description language) which does not depend on a device resolution etc.

In case of using the image forming apparatus 10 as a copier, the system controller 40 is to transmit a read-out instruction to the scanner 32. In response to this read-out instruction, the scanner 32 will read out the image data of the manuscript on the manuscript table 31 and transmit the read out data to the system controller 40. As the system controller 40 receives the image data, it will arrange such that this data will be once stored in the image data memory 41.

The system controller 40 is to store data set up by a user operating the operation inputting unit 44 to the setup data memory 42. The setup data memory 42 is a nonvolatile memory, such as a flash memory, which is rewritable. The unique data memory 43 is a ROM which stores data unique to the image forming apparatus 10. This unique data stored in the unique data memory 43 includes the above-mentioned unique code 50. Here, it is also possible to use a predetermined region of hard disc instead of the setup data memory 42 and the unique data memory 43.

Figure 3:
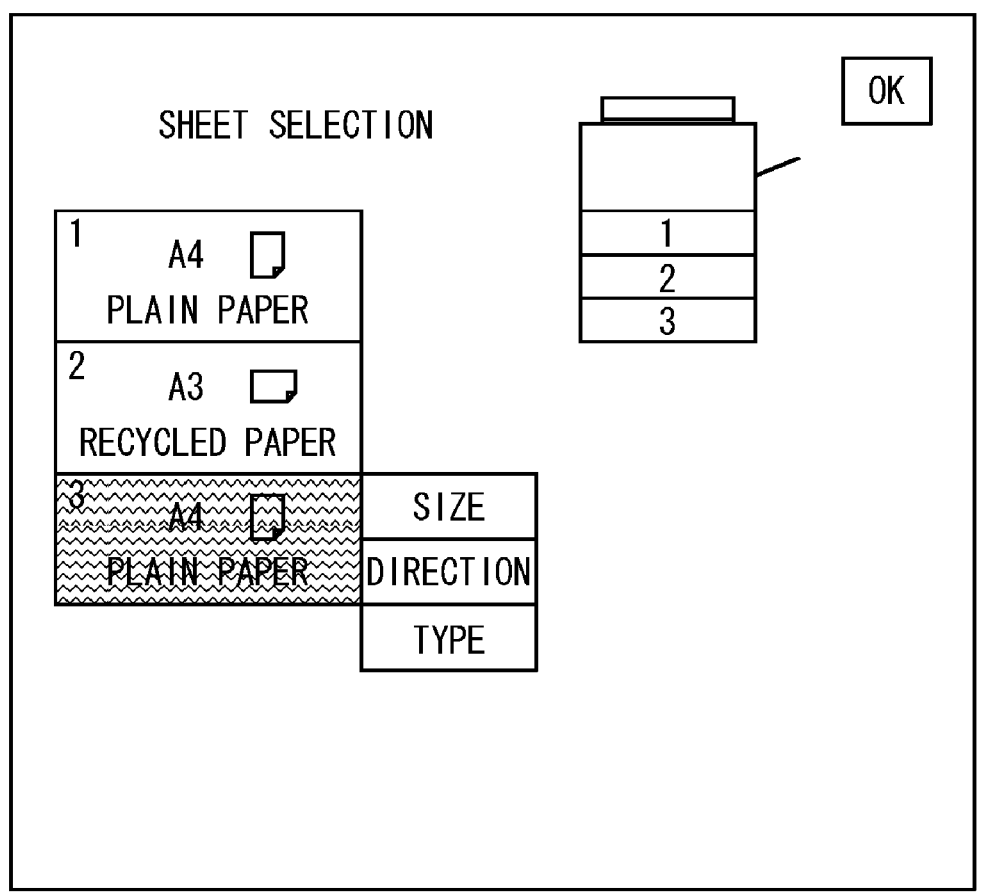
FIG. 3 is an operation screen view for setting up the image forming apparatus according to the embodiment of the present invention.
Figure 4:
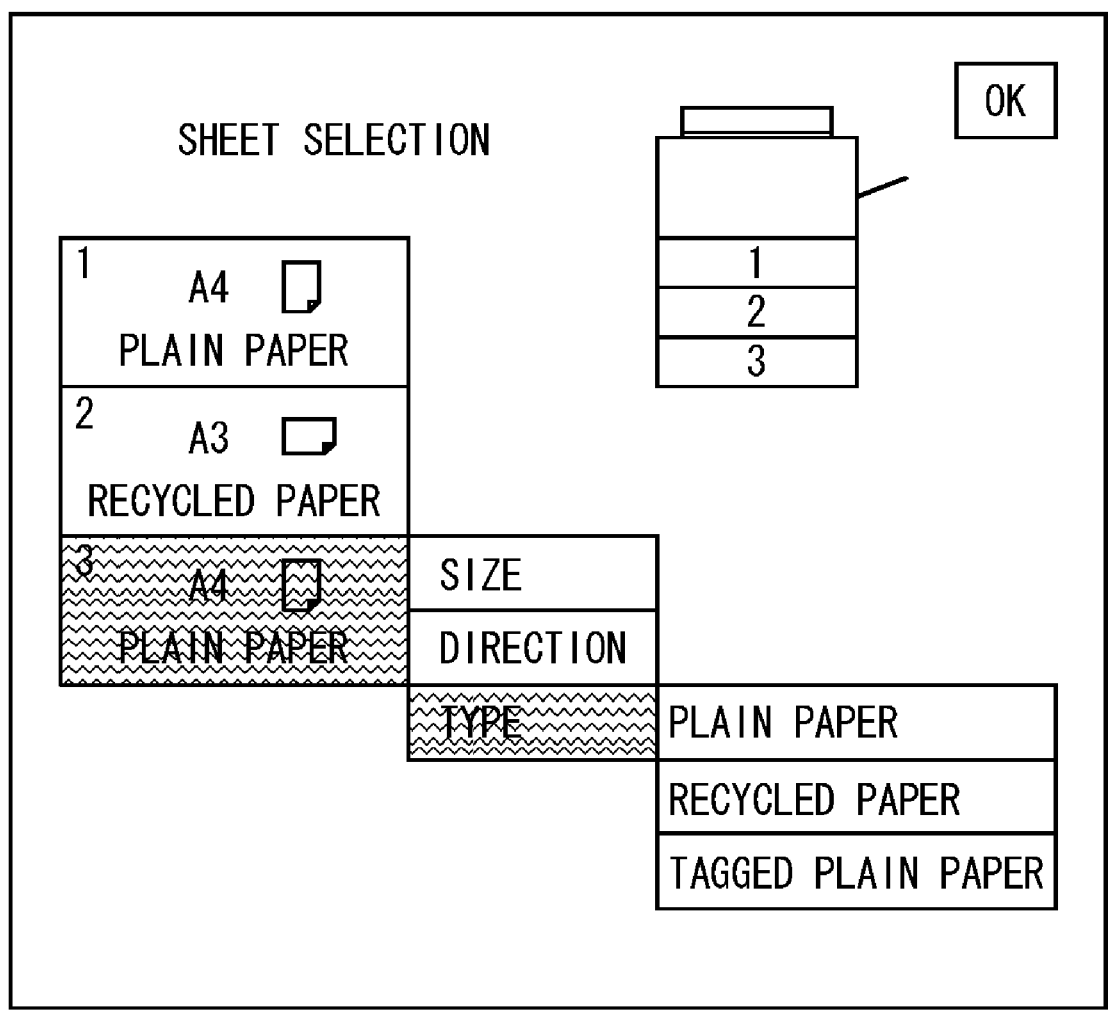
FIG. 4 is an operation screen view for setting up the image forming apparatus according to the embodiment of the present invention.

Before using the document protection function of the image forming apparatus 10, a user should operate the operation inputting unit 44 to set up the printing paper with the electronic tags to one of the paper feeding trays 111, 112 and 113. FIG. 3 and FIG. 4 show operation screens for this setup. These operation screens are displayed on a touch panel of the image forming apparatus 10.

In FIG. 3, reference numbers 1, 2 and 3 are identification numbers of the paper feeding trays and correspond with the paper feeding trays 111, 112 and 113 shown in FIG. 1, respectively. In each of rectangular spaces numbered 1, 2 and 3 which represent the paper feeding trays 111, 112 and 113, respectively, a size, direction and type of printing paper is indicated based on data stored in the setup data memory 42. This particular embodiment shows a case in which setting of the paper feeding trays is changed such that the paper feeding tray 3 is set with sheets of A4 vertical printing paper with electronic tags attached thereto, while in the original setting, the paper feeding trays 1 and 3 should be set with sheets of seize A4 vertical plain paper and the paper feeding tray 2 should be set with sheets of size A3 horizontal recycled paper.

When the rectangular space 3 indicating the paper feeding tray 113 is selected by touch, the selected part will be highlighted (in FIG. 3, this part is shown in hatched pattern) and a pull-down menu including a size, direction and type of the printing paper to be set to the paper feeding tray 113 will be displayed. When the highlighted rectangular space 3 corresponding to the paper feeding tray 113 is touched again, the pull-down menu will disappear and the display will return to the original state (this sequence will be the same with other selecting operations). When the type of printing paper is selected in a screen shown in FIG. 3, the selected part will be highlighted and a further pull-down menu in a lower echelon will be displayed as shown in FIG. 4. In fact, there are more possible options for the types of printing paper, but in order to simplify the description of this embodiment, FIG. 4 shows only three options. In FIG. 4, when tagged plain paper is selected, the indication of 'plain paper' inside the rectangular space 3 corresponding to the paper feeding tray 113 will change to 'tagged plain paper'. The setup data set up by such operation will be once stored in the work area of the memory. When an 'OK' button in the upper right corner of the screen, for instance, is touched, the setup data will be transferred from the work area to the setup data memory 42, upon which the set up data will be updated.

The host computer HC shown in FIG. 1 has a printer driver PD for the image forming apparatus 10 installed. When the printer driver PD is run, a print setup dialog will be displayed, and upon selecting one of the tabs, an operation screen for setting up the document protection function, such as the one shown in FIG. 5, will be displayed.

In case of encoding a text and then have it printed, the document protection function can be turned on by pointing and clicking a radio button 'ON' using a pointing device, or in other case, the document protection function can be turned off by pointing and clicking a radio button 'OFF' using the pointing device.

Figure 5:
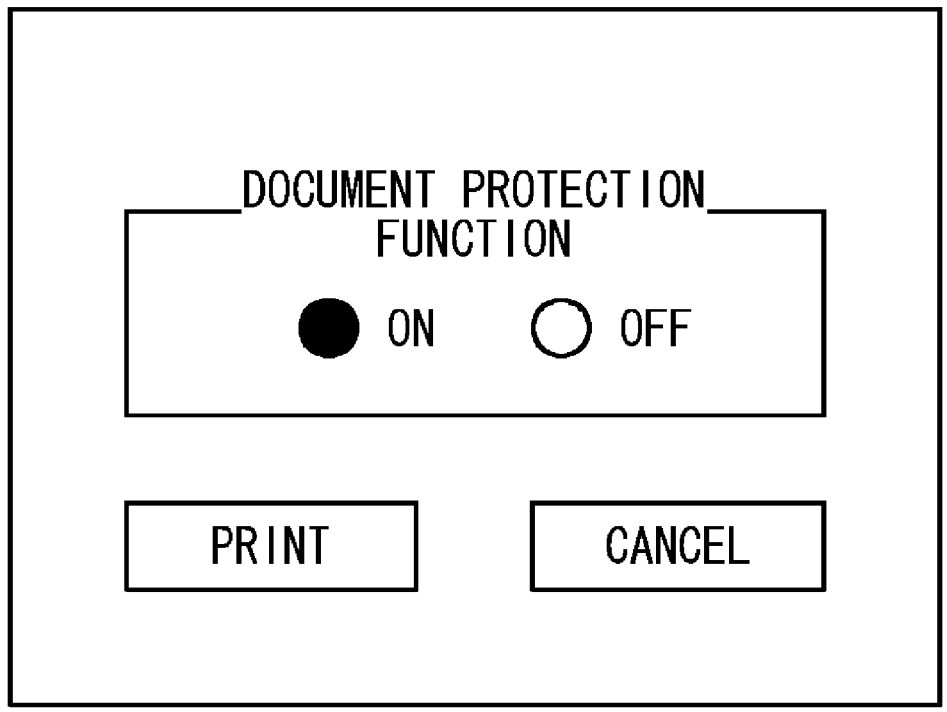
FIG. 5 is an operation screen view for setting up the image forming apparatus according to the embodiment of the present invention.

When a 'Print' button shown in FIG. 5 is touched, image data including the print setup data will be transmitted from the host computer HC to the system controller 40. As the system controller 40 receives the image data, it will have the data once stored into the image data memory 41.

Figure 6:
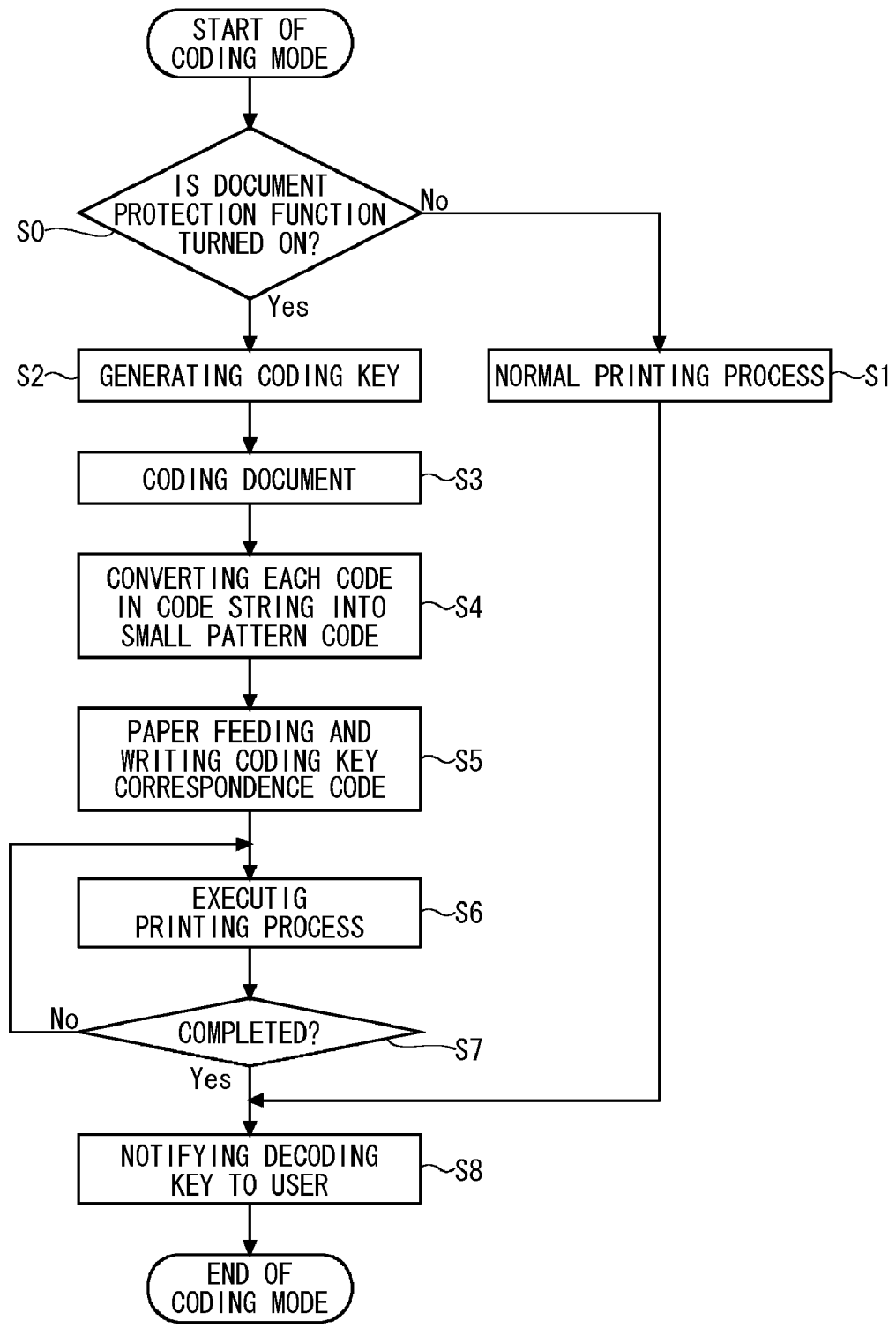
FIG. 6 is a flowchart showing processes to be conducted by a system controller of the image forming apparatus according to the embodiment of the present invention.

FIG. 6 is a flowchart showing processes to be conducted by the system controller 40 after the image data is stored into the image data memory 41 as described above.

In step S0, the system controller 40 checks the contents of the image data memory 41 to determine whether the document protection function is turned on or off. Then the system controller 40 proceeds to step S1 when it confirms that the document protection function is turned off (No of Step S0), or it proceeds to step S2 when it confirms that the document protection function is turned on (Yes of Step S0).

In step S1, the system controller 40 conducts a normal printing process unrelated to the document protection function and terminates the process.

In step S2, the system controller 40 automatically generates coding keys and coding key correspondence code 51 using a random number generation function etc. Furthermore, the system controller 40 generates decoding keys based on the coding keys generated in this step.

In step S3, the system controller 40 encodes the image data stored in the image data memory 41 by a triple DES (Data Encryption Standard) system, for instance, and then the system controller 40 transmits the coded image data as a code string to the printing unit controller 46 along with a pattern conversion instruction.

Figure 7:
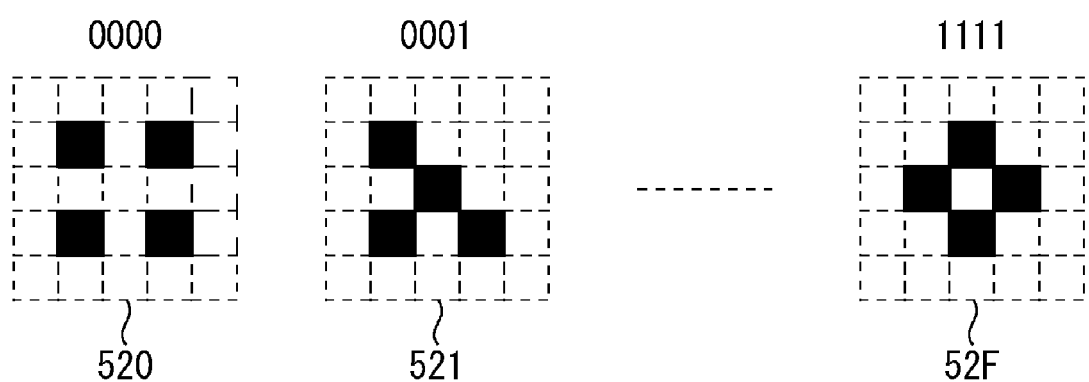
FIG. 7 is a diagram representing a correspondence between 4-bit hexadecimal codes '0' to 'F' and small patterns according to the embodiment of the present invention.

In step S4, in response to the transmission of the code string and the pattern conversion instruction from the system controller 40, the printing unit controller 46 converts each code (e.g. each 4-bit code) in the code string into a predetermined small pattern. For instance, as shown in FIG. 7, 4-bit hexadecimal codes '0' to 'F' are converted into small patterns 520 to 52F. Broken lines in each small pattern shown in FIG. 7 are used to facilitate understanding of the small patterns and they show parts which are not for printing. Each small pattern is a 5×5 dot pattern, of which dots in the outmost perimeter are used for discriminating a boundary between each adjacent small pattern and do not include black dots. There are 126 ways of arranging arbitrary four dots in a 5×5 matrix, and 16 of them which are difficult to be misclassified are used for the small patterns.

In step S5, the system controller 40 starts feeding the printing paper 123 inside the selected paper feeding tray 113 using the conveyance roller controller 45, and have the unique code 50 and the coding key correspondence code 51 generated in step S2 written on the electronic tag 33 at predetermined timing via the tag writer 35.

In steps S6 and S7, the printing unit controller 46 forms an electrostatic latent image of a small pattern array image on the photoconductive drum 21 by controlling the laser beam LB on and off based on the small pattern array image data, while having the photoconductive drum 21 scanned by the laser beam LB. On the other hand, the system controller 40 arranges to have a feeding unit be driven via the conveyance roller controller 45 based on status information received from the printing unit controller 46 and information received from a printing paper sensor. As for the second page and pages beyond that, sheets of untagged printing paper are fed for printing. As the printing is finished with all pages (Yes of Step S7), the system controller 40 will proceed to step S8.

Through the processes described above, coded document is produced.

In step S8, the system controller 40 transmits the decoding keys generated in Step S2 to the host computer HC. In response to the transmission of the decoding keys, the printer driver PD will transmits to a predetermined address an e-mail of a text including the decoding keys.

Figure 8:
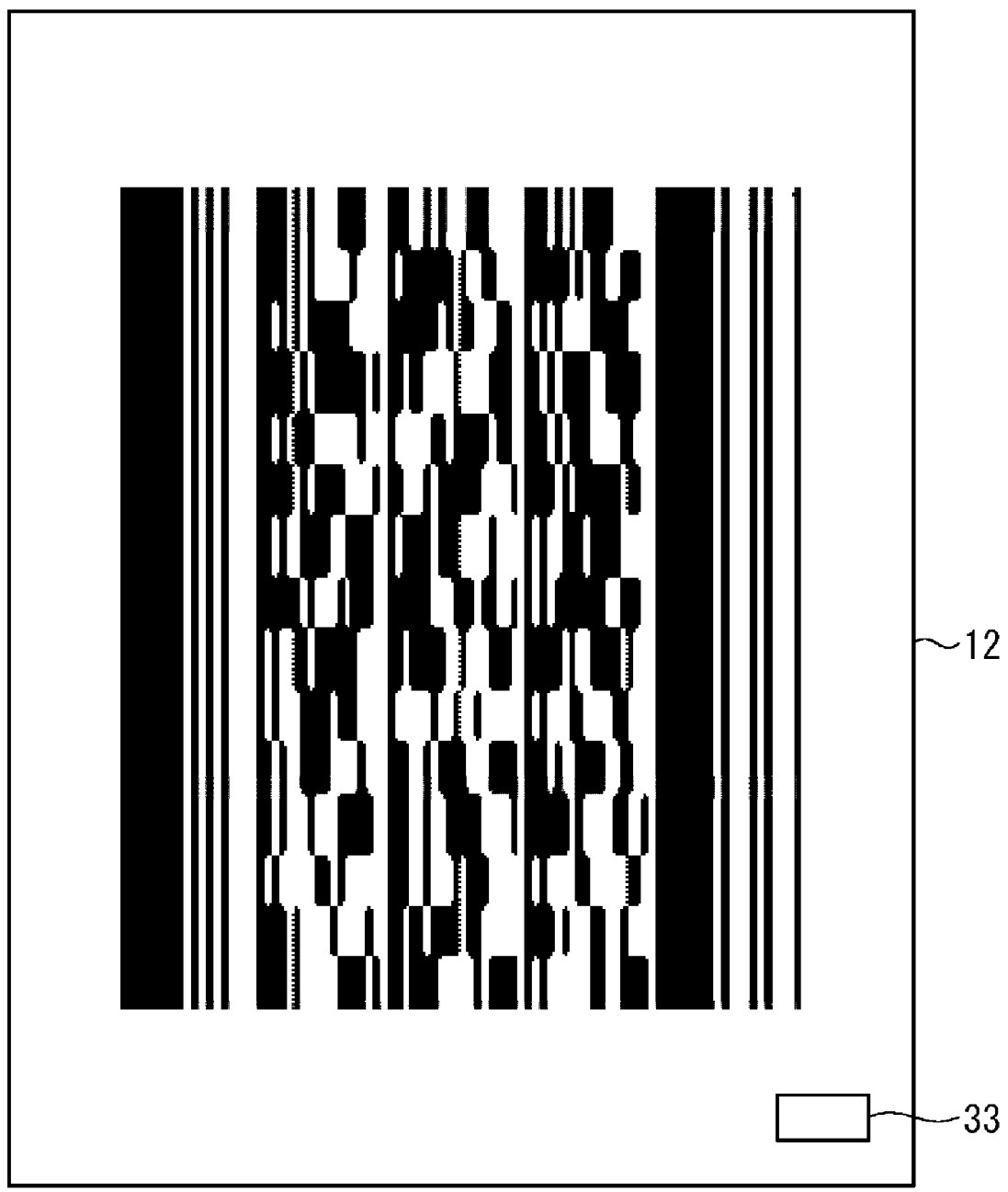
FIG. 8 is a pattern diagram representing an image of a manuscript which has been printed out in a coding mode according to the embodiment of the present invention.

FIG. 8 is a pattern diagram representing the image of the manuscript 12 which has been printed out in the coding mode.

Figure 9:
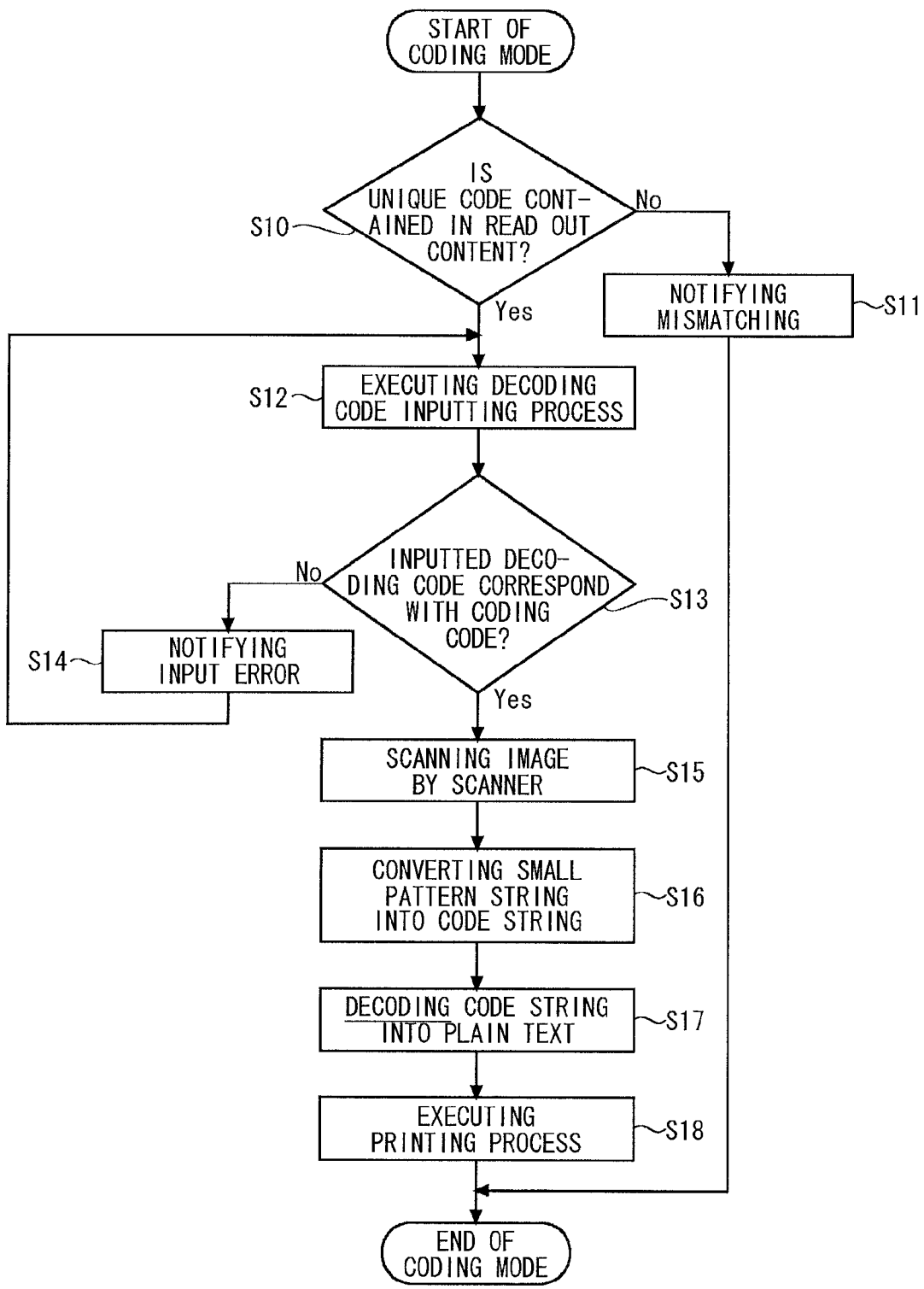
FIG. 9 is an flowchart showing the processes to be conducted by the system controller of the image forming apparatus according to the embodiment of the present invention.

FIG. 9 is a flowchart showing the processes to be conducted by the system controller 40. These processes will start by pressing a copy start button in the operation inputting unit 44.

In step S10, the system controller 40 arranges that the contents stored in the electronic tag 33 of the manuscript 12 placed on the manuscript table 31 is read out by the tag reader 34. If the unique code 50 contained in the read out contents does not coincide with the unique code stored in the unique data memory 43 (No of Step S10), the system controller 40 proceeds to step S11, or if the unique code 50 coincides with the unique code stored in the unique data memory 43 (Yes of Step S10), the system controller 40 will proceed to step S12.

In step S11, the system controller 40 arranges to have information indicating that the manuscript is not applicable for decoding with the image forming apparatus 10 displayed on the display of the operation inputting unit 44, and it also rings an electronic buzzer, before terminating the process.

In step S12, the system controller 40 advises the user to input decoding keys via the operation inputting unit 44. In response, the user inputs the decoding keys, and touches a 'Verification' button (not shown).

In step S13, the system controller 40 responds to the inputs by the user, encodes the decoding keys and determines whether they match the coding key correspondence code 51. When they are found not matching (No of Step S13), the system controller 40 proceeds to step S14, or when they are found matching (Yes of Step S13), the system controller 40 proceeds to step S15.

In step S14, the system controller 40 arranges to have information indicating that there is an input error displayed on the display of the operation inputting unit 44, and goes back to step S12.

In step S15, the system controller 40 arranges to have the scanner 32 reads out the image on the manuscript 12.

In step S16, the system controller 40 converts each small pattern in the small pattern string of the read out image data (q.v. FIG. 7) into a hexadecimal code based on the correspondence between small patterns and hexadecimal codes. In addition the correspondence between small patterns and hexadecimal codes is controlled by the system controller 40 in advance.

In step S17, the system controller 40 arranges to have the image data written in PDL restored by decoding the converted codes using the decoding keys, and then the system controller 40 arranges to have the restored image data once stored in a predetermined region inside the image data memory 41.

In step S18, the system controller 40 controls the conveyance roller controller 45 and the printing unit controller 46 based on the image data stored in the image data memory 41 and the contents of the setup data memory 42 to have the printing paper delivered and then have the image formed on the printing paper.

As described above, according to this embodiment of the present invention, since a manuscript is converted into a coded pattern, it is possible to protect confidential information written on the manuscript from leaking, even if the manuscript happens to be left behind on the manuscript table of the image forming apparatus or other place. Furthermore, according to this embodiment, in the decoding mode, the image forming process will not be conducted unless the decoding keys inputted by the user correspond with the coding key correspondence code 51 read out from the electronic tag 33 attached to the coded document 12. Therefore, it is possible to prevent unnecessary image forming from being executed on printing paper due to incorrect input of decoding keys, and thereby it is possible to prevent the coded document from being figured out due to misplacing the printed manuscript.

Moreover, according to this embodiment of the present invention, in the decoding mode, before the user inputs the decoding keys, the unique code 50 is read out from the electronic tag 33 attached to the coded document 12, and in case when it is determined that this unique code 50 does not correspond with the unique data stored in the unique data memory 43, the user will be notified of device nonconformity. Therefore, in attempting decoding, the user will be able to promptly determine whether the image forming apparatus is applicable to the decoding, and thereby can save unnecessary time and efforts.

Furthermore, considering a case when the image forming apparatus 10 is provided with hard disc and the coding key correspondence code 51 is stored in this hard disc, if the coded document 12 is to be decoded at multiple separate places (i.e. at multiple image forming apparatuses), it is necessary to coordinate linkage among the image forming apparatuses and synchronize the memory contents, which leads to complicate the system. However, in this embodiment, since the coding key correspondence code 51 is to be written on the electronic tag 33 attached to the coded document 12, it is possible to prevent the system from becoming complicated and to utilize the document protection function at low cost.

In addition, according to this embodiment of the present invention, since the decoding keys and the coding keys are automatically generated by the image forming apparatus 10, it is possible to prevent the decoding keys from being figured out using simple coding keys.

This invention can have other modified forms.

In the above embodiment of the present invention, the case of coding the entire image data for printing and decoding the printed image was described. However, the present invention is not limited to this arrangement, and it is possible to apply the following structure, for instance. In this structure, by having only confidential contents within the entire document being designated by an application program of the host computer HC, only the confidential contents are coded by the system controller 40 under the coding mode as shown in FIG. 10, and information representing this confidential contents is written to the electronic tag 33. In the decoding mode, this information is read out and the above described decoding process is conducted only with respect to the confidential contents, and a normal process is conducted with respect to the other contents.

Furthermore, it is possible to have a structure in which the information representing the coded contents should not be stored in the electronic tag 33 by having a header and a tooter attached to the beginning and the end of the small pattern string, respectively.

Moreover, it is possible to have a structure in which a public key of the asymmetric key cryptosystem is used as the coding key of the coding key correspondence code 51 while the coding key correspondence code 51 is used as the public key itself, and a private key of the asymmetric key cryptosystem is used as the decoding key.

Moreover, in an image forming apparatus selectively using more than two kinds of coding systems, it is possible to have more than two kinds of unique data, and in this case, in Step S10 of FIG. 9, it is determined as a mach if unique data corresponding to one of more than two kinds of unique data is stored in the electronic tag 33.

Moreover, although the case of coding image data written in PDL was described in the above embodiment of the present invention, it is also possible to have a structure in which bitmap data or corresponding image compressed data is coded.

Figure 11:
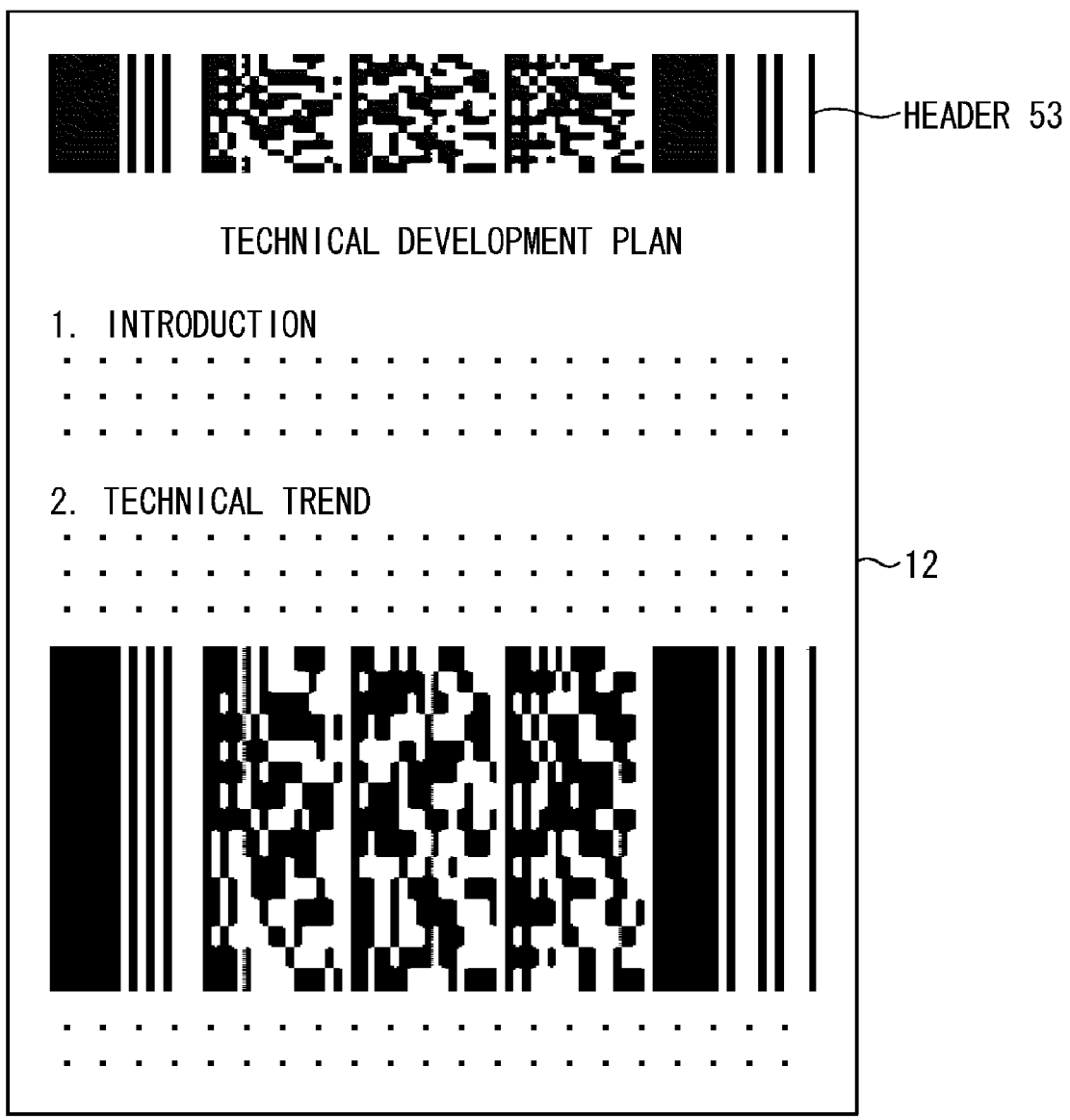
FIG. 11 is a pattern diagram representing an image of a manuscript which has been printed out in a coding mode according to other modified embodiment of the present invention.

Moreover, although the case of using the electronic tag 33 as a decoding data recording means was described in the above embodiment of the present invention, it is also possible to have a structure in which the codes of unique code 50 and coding key correspondence code 51 are converted into small patterns as described above and a pattern image is formed in the header 53 in the upper part of the manuscript 12 instead of using the electronic tag 33, as shown in FIG. 11. In this structure, since the electronic tag 33 is unnecessary, a running cost can be made inexpensive. Moreover, since the scanner 32 can be used in place of the tag reader 34 and the printing unit 20 can be used in place of the tag writer 35, it is not necessary to have the tag reader 34 and the tag writer 35 provided inside the image forming apparatus 10, and therefore, it is possible to manufacture the image forming apparatus 10 at comparatively low cost.

It is also possible to have a structure in which electronic tag 33 or the header is attached to or formed on each page of the manuscript 12.

Moreover, since a display in a compact printer is comparatively small, the setup means in the present invention is not limited to the one having the GUI (Graphical User Interface), but it can be such setup means provided with a means, such as an electrical keyboard, which can display characters and symbols.

Moreover, although the case in which the image forming apparatus 10 is a printer or a copier was described in the above embodiment of the present invention, the image forming apparatus 10 may be a facsimile or the like as well.

In addition, the system of image forming means is not limited to the laser electrostatic image transferring system, but as long as it is possible to form images on the fed sheet of printing paper, it may be an ink-jet system or the like.

While the preferred embodiments of the invention have been described using specific terms, such description is for illustrative purposes only, and it is to be understood that changes and variations may be made without departing from the spirit or the scope of the following claims.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

Moreover, terms that are expressed as "means-plus function" in the claims should include any structure that can be utilized to carry out the function of that part of the present invention.

What is claimed is:

1. An image forming apparatus comprising:
   a manuscript table;
   a scanner being configured to scan an original image on a sheet of printing paper placed on the manuscript table;
   an electric tag reader being arranged on the manuscript table;
   a paper feeding tray stocking one or more sheets of printing paper;
   a printing unit being configured to print an image on a sheet of printing paper;
   a paper feeder being configured to feed the printing paper to the printing unit and to discharge the printing paper with the printed image to a discharge tray;
   an electric tag writer being arranged on a paper carrier path;
   an inputting unit being arranged to allow a user to input a decoding key; and
   a controller switching between a coding mode and a decoding mode, in the coding mode, the controller
      converting image data into coded data with a code string using a coding key,
      making the printing unit form a small pattern string on a sheet of printing paper by printing small patterns on the printing paper, the small patterns being printed on the sheet of printing paper, the small patterns having coded shapes being different from shapes of the original image, and
      making the electric tag writer record the coding key or data corresponding to the coding key in a recording medium combined with the printing paper, each small pattern corresponding to a code constructing the coded data, and
   in the decoding mode, the controller
      making the electric tag reader read out recorded data from the recording medium,
      determining whether the decoding key inputted from the inputting unit corresponds with the recorded data read out from the recording medium,
      making the scanner scan the small pattern string recorded on the printing paper when the decoding key inputted from the inputting unit corresponds with the recoded data read out from the recording medium,
      converting the small pattern string scanned from the printing paper into the code string,
      decoding the code string into the original image data using the decoding key, and
      making the printing unit print the original image on a sheet of printing paper based on the image data.

2. The image forming apparatus according to claim 1, wherein
   in the decoding mode, the controller determines whether the recorded data include a unique data, and requests a user to input the decoding key from the inputting unit when the recorded data include the unique data.

3. The image forming apparatus according to claim 1, wherein the controller generates the coding key and the decoding key.

4. An image forming apparatus comprising:
   a manuscript table;
   a scanner being configured to scan an original image on a sheet of printing paper placed on the manuscript table;
   a paper feeding tray stocking one or more sheets of printing paper;
   a printing unit being configured to print an image on a sheet of printing paper;
   a paper feeder being configured to feed the printing paper to the printing unit and to discharge the printing paper printed with the printed image to a discharge tray;
   an inputting unit being arranged to allow a user to input a decoding key; and
   a controller switching between a coding mode and a decoding mode, in the coding mode, the controller
      converting image data into coded data with a first code string using a coding key,
      making the printing unit form a first small pattern string on a sheet of printing paper by printing first small patterns on the printing paper, the first small patterns being printed on the sheet of printing paper, the first small patterns having coded shapes being different from shapes of the original image,
      converting each code included in a second code string of the coding key or data corresponding to the coding key into second small patterns, and
      making the printing unit form a second small pattern string by printing the second small patterns on a predetermined region of the printing paper, each first small pattern corresponding to a code constructing the coded data, and
   in the decoding mode, the controller
      making the scanner scan the second small pattern string from the predetermined region of the printing paper, obtaining the coding key or the data corresponding to the coding key by converting the second small pattern string scanned from the predetermined region into a code string, determining whether the decoding key inputted from the inputting unit corresponds with the coding key or the data corresponding to the coding key obtained by converting the second small pattern string scanned from the predetermined region into the code string, making the scanner scan the first small pattern string printed on the printing paper when the decoding key inputted from the inputting unit corresponds with the coding key or the data corresponding to the coding key obtained by converting the second small pattern string scanned from the predetermined region into the code string, converting the first small pattern string scanned from the printing paper into the first code string, decoding the first code string into the original image data using the decoding key, and making the printing unit print the original image on a sheet of printing paper based on the image data.

5. The image forming apparatus according to claim 3, wherein in the decoding mode, the controller determines whether the code string obtained by converting the second small pattern string includes a first unique data, and requests a user to input the decoding key from the inputting unit when the code string obtained by converting the second small pattern string includes the first unique data.

6. The image forming apparatus according to claim 4, wherein the controller generates the coding key and the decoding key.

* * * * *